US010142592B1

(12) United States Patent
Van Ness

(10) Patent No.: US 10,142,592 B1
(45) Date of Patent: Nov. 27, 2018

(54) SMART MINOR

(71) Applicant: James Van Ness, Piscataway, NJ (US)

(72) Inventor: James Van Ness, Piscataway, NJ (US)

( * ) Notice: Subject to any disclaimer, the term of this patent is extended or adjusted under 35 U.S.C. 154(b) by 0 days.

(21) Appl. No.: 15/987,770

(22) Filed: May 23, 2018

Related U.S. Application Data

(60) Provisional application No. 62/509,866, filed on May 23, 2017.

(51) Int. Cl.
*H04N 7/14* (2006.01)
(52) U.S. Cl.
CPC .............. *H04N 7/147* (2013.01); *H04N 7/142* (2013.01)
(58) Field of Classification Search
CPC combination set(s) only.
See application file for complete search history.

(56) References Cited

U.S. PATENT DOCUMENTS

| | | | |
|---|---|---|---|
| 2007/0040033 A1* | 2/2007 | Rosenberg | A47G 1/02 235/462.36 |
| 2010/0022351 A1* | 1/2010 | Lanfermann | A61B 5/1114 482/1 |
| 2011/0249168 A1* | 10/2011 | Osann, Jr. | A47F 10/00 348/333.08 |
| 2017/0227791 A1* | 8/2017 | von und zu Liechtenstein | G02F 1/01 |
| 2017/0285345 A1* | 10/2017 | Ferens | G06T 11/00 |
| 2017/0319148 A1* | 11/2017 | Shahin | H04N 13/204 |
| 2018/0137523 A1* | 5/2018 | Kim | G06Q 30/0201 |

* cited by examiner

*Primary Examiner* — Joseph J Nguyen
(74) *Attorney, Agent, or Firm* — IPS Legal Group, P.A.

(57) ABSTRACT

A smart mirror comprises at least one large touchscreen-enabled smart mirror mounted on at least one frame, wherein the smart mirror is configured to support large-screen video chat, wherein the other participant to the video chat is provided full-size on the smart mirror's screen. When not in use as a video chat device, the present invention may utilize one or more cameras to create a mirror effect on the smart mirror's screen.

9 Claims, 9 Drawing Sheets

SMART MINOR

CROSS-REFERENCE TO RELATED APPLICATION

This application claims priority to U.S. Provisional Application No. 62/509,866 filed on May 23, 2017, the disclosure of which, including any materials incorporated by reference therein, is incorporated herein by reference in its entirety.

TECHNICAL FIELD

The present invention relates generally to a smart mirror and video chat system. More particularly, the present invention concerns a smart mirror capable of supporting full-size renderings of at least one participant to a video chat.

BACKGROUND

Today's technological advances provide consumers with enhanced ways to communicate with their families and friends, especially when they are separated by great distances. Various apps, like Skype® and Facetime®, allow users to see the faces of the other parties on a small display screen during conversations. Unfortunately, such an experience does not fully substitute for face to face contact, because the other party's image is so small. What is needed is a video chat system wherein a user is able to watch full-sized images of the other parties as well as to capture pictures and videos during these conversations so they may be replayed again and again. Such an invention would allow family members in distant cities, states and countries to feel closer to their loved ones. What is needed therefore is a video chat device wherein a full-size rendering of the other participant is displayed on a "smart mirror."

Attempts have been made, although unsuccessfully, to solve this problem. One illustrative attempt may be seen with respect to U.S. Patent Application Publication No. 2011/0205425, incorporated by reference in its entirety herein, which generally discloses a projector adapted for use with a webcam. While this disclosure does provide for a video chat using a larger image, its reliance on projector technology makes it incompatible with some video chat needs.

Another attempt to meet this need may be seen with respect to U.S. Patent Application Publication No. 2015/0301559, incorporated by reference in its entirety herein, which generally discloses a windshield for mating a mobile phone with an auxiliary display. While this disclosure does generally provide for a larger video chat, it fails to provide for a smart mirror.

As may be seen, various attempts have been made to solve the problems which may be found in the related art but have been unsuccessful. A need exists for a new video chat system and device that provides full-size renderings of at least one participant to avoid the challenges and problems with the prior art.

SUMMARY OF THE INVENTION

It is to be understood that in the present disclosure, all embodiments are provided as illustrative and non-limiting representatives of many possible embodiments. In addition, the terms "is," "may," "will," and the like are herein used as synonyms for and interchangeable with terms such as "may," "may provide for," and "it is contemplated that the present invention may" and so forth.

Furthermore, all elements listed by name, such as a mirror, camera, image, etc., are herein meant to include or encompass all equivalents for such elements. For example, in addition to a "mirror," any electronic screen, reflective or otherwise, is also contemplated by the present invention. Such equivalents are contemplated for each element named in its particular herein. Moreover, while the invention will be described in connection with video chats, it is understood that the invention is not limited in scope to use with video chats, but may also be used with any internet and camera-based communication system or device.

For purposes of summarizing, certain aspects, advantages, and novel features of the present invention are provided herein. It is to be understood that not all such aspects, advantages, or novel features may be provided in any one particular embodiment. Thus, the disclosed subject matter may be embodied or carried out in a manner that achieves or optimizes one aspect, advantage, or novel feature or group of features without achieving all aspects, advantages, or novel features as may be taught or suggested.

In view of the foregoing disadvantages inherent in the known art, the smart mirror of the present invention provides a novel and authentic-feeling video chat experience. The general purpose of the present invention, which shall be described subsequently in greater detail, is to render the other party to a video chat in life-size or nearly life-size, so as to make it feel like the two participants may be in each other's presence. The features of the invention are believed to be novel and to have been particularly pointed out and distinctly claimed in the concluding portion of the specification. These and other features, aspects, and advantages of the present invention will become better understood with reference to the following drawing and detailed description.

The present invention comprises an electronic or digital mirror ("smart mirror"), generally although not exclusively a full-length or large smart mirror, that may support a video chat system wherein full-size renderings of at least one participant are displayed on the screen of the smart mirror. In some embodiments, the digital mirror may take pictures (freeze frames) and record videos of whoever is standing in front of it. For example, the present invention may be used when video chatting from one mirror to another and when using compatible devices. Furthermore, the present invention may make it possible to see the whole person or likeness of the other participant to a video chat, via a reasonable sized image, so a user may feel as though the other party to the video chat is just across the room.

The present invention's mirrors may be of any size, including but not limited to three illustrative size embodiments. By way of illustration and not limitation, the present invention may provide for a rectangular, full-length mirror that may stand on its own accord or be hung on a wall. Moreover, the present invention may provide for a full-length oval mirror that may also be mounted on a stand or hung on a wall. The present invention may provide for one or more fasteners that may be used to attach the mirrors to a stand's pivot, so they may be adjusted to provide the best possible view of the other party. There is also a smaller square version, which may be held in one's hand like a giant tablet. Cameras, speakers, and light strips may be built into the digital frames of at least one mirror. A charging port with a detachable cord, and a docking station for the sleek, wireless remote may be also part of the frame. The present invention's mirror may transform into a touch screen with a keyboard when it is turned on, allowing pictures and videos to be tagged and time stamped when they may be captured.

Built-in Wi-Fi and Bluetooth functionality allow the pictures and videos to saved and uploaded directly onto social media sites.

In some embodiments, the present invention may provide for a full length mirror, wherein the mirror has one or more of the following elements connected to it or embedded within it: at least one touchscreen, at least one camera, Bluetooth and WiFi connectivity, at least one speaker, at least one USB port, at least one light strip, at least one battery, at least one charging port, at least one LED light, at least one remote port, at least one digital frame, at least one detachable charging port plug chord, at least one docking port, at least one mirror stand, and at least one wall mount (if necessary).

The unique features of this product will provide the following benefits for consumers everywhere: it may serve as a mirror when not in use; it may provide the same functionality as a tablet or smartphone; it may make persons far away, like soldiers overseas, business travelers and distant family members, seem closer, when they are able to see full-sized images of the parties while conversing; it may be able to capture and save screen shots and videos that be helpful when tracking a person's weight loss or to document conference calls; and it may be used to create and preserve memories from special occasions like weddings, bar and bat mitzvahs, birthday parties, and anniversary celebrations; and, because the frame is also digital, it may also be changed to fit the decor of the room with colors and styles preset in the mirror, as well as provide other benefits.

The embodiments of the invention described herein are exemplary and numerous modifications, variations and rearrangements may be readily envisioned to achieve substantially equivalent results, all of which are intended to be embraced within the spirit and scope of the invention. Furthermore, while the preferred embodiment of the invention has been described in terms of the components and configurations, it is understood to that the invention is not intended to be limited to those specific dimensions or configurations but is to be accorded the full breadth and scope of the spirit of the invention.

BRIEF DESCRIPTION OF THE DRAWINGS

These and other features, aspects and advantages of the present invention will become better understood with regard to the following description, appended claims, and accompanying figures where:

DETAILED DESCRIPTION

The present invention overcomes the limitations of the prior art by providing a new and more effective full-length video chat screen.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any embodiment or element of an embodiment disclosed in this disclosure will be determined by its intended use.

It is to be understood that the drawings and the associated descriptions are provided to illustrate potential embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known features, elements or techniques may not be shown in detail in order not to obscure the embodiments.

Figure 1:
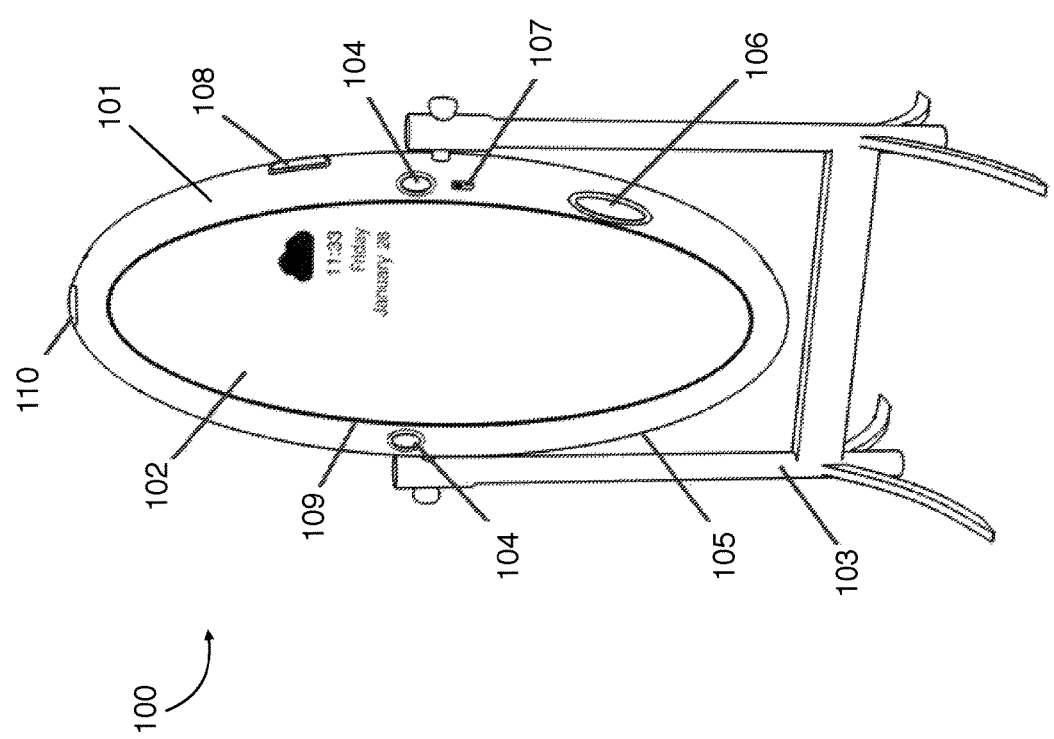
FIG. 1 shows a front perspective view of an embodiment of a smart mirror.

Turning attention to FIG. 1, a front perspective view of an embodiment of a smart mirror is shown. In the embodiment depicted, a viewer may perceive smart mirror 100, frame 101, mirror/touch screen 102, stand 103, camera 104, battery 105, remote dock station 106, USB port 107, speakers 108, light strip 109, and wifi 110.

In some embodiments, frame 101 may be comprised of wood, metal, plastic, carbon fiber, ceramic, or any other material known in the art. Additionally, in embodiments wherein more than one mirror/touch screen 102 may be provided, frame 101 may be configured to retain each mirror/touch screen 102 in any configuration, such as but not limited to two or more mirror/touch screens 102 arranged side by side, vertically, diagonally, or any other configuration on frame 101. As well, frame 101 may retain one or more elements of the present invention on the front, rear, side, or bottom side of frame 101 in addition to or in the alternative to the embodiment disclosed in FIG. 1. By way of non-limiting example, any of camera 104, battery 105, remote dock station 106, USB port 107, speakers 108, light strip 109, and wifi 110 may be located on the front, left side, right side, rear, top, or bottom side of frame 101.

Mirror/touch screen 102 may, in some embodiments, be any electronic device capable of processing video and audio as well as displaying video and playing audio through one or more speakers 108, capturing audio by means of one or more microphones, and displaying video by means of one or more screens. By way of illustration and not limitation, mirror/touch screen 102 may be a tablet, computer, mobile phone, desktop computer, touchscreen, or a combination of one or more electronic devices having one or more processors. Mirror/touch screen 102 may be configured to display video from one or more video chats conducted via one or more cameras 104, the audio of which may be played through one or more speakers 108. In addition to video chats, mirror/touch screen 102 may be configured to store and play music, provide audio-only calling, play television, on-demand video, movies, and video games, mimic a fish tank, display and scroll photos, or provide any other function associated with the electronic devices mentioned herein or known in the art. Mirror/touch screen 102 may also utilize one or more cameras 104 and may serve as a mirror when not in use for video chatting. Moreover, mirror/touch screen 102 may itself be reflective, thus serving as a mirror without the use of a camera 104. In embodiments with more than one mirror/touch screen 102, the present invention may provide that video or images from one mirror/touch screen 102 may cross over or overlap with the display of mirror/touch screen 102. In some embodiments, mirror/touch screen 102 may cover the entirety of frame 101. In some embodiments where mirror/touch screen 102 may cover the entirety of frame 101, one or more elements such as but not limited to camera 104, battery 105, remote dock station 106, USB port 107, speakers 108, light strip 109, and wife 110 may connect with frame 101 through one or more apertures or elements disposed on mirror/touch screen 102. Mirror/touch screen 102 may be operated by its touchscreen, or by a remote control (not pictured), or both. Mirror/touch screen 102 may have a sleep mode that may be turned off when camera 104 detects motion. Mirror/touchscreen 102 may provide for a user to draw words or pictures on the screen of mirror/touchscreen 102 using the user's finger, stylus, or other instrument and may provide the visual indications of such drawing to other participants, may make a digital recording of the drawing, or both.

Stand 103 may be configured as a tripod, four-legged, two-legged, or any other shape of stand 103. Moreover, stand 103 may be comprised of wood, metal, plastic, carbon fiber, ceramic, or any other material known in the art. Moreover, stand 103 may be configured to tilt, swing, fold, roll, and so forth via one or more hinges or wheels as may be appropriate, or via any other hardware required.

Camera 104 may be a digital camera configured to stream video and/or capture images. In some embodiments, camera 104 may provide a wide-angle lens, a traditional lens, or a narrow-focus lens. In some embodiments, camera 104 may be a "lipstick" camera 104 or other form of low-profile camera 104. Provided the present invention has sufficient power, in some embodiments, camera 104 may be always on, and may wake mirror/touch screen 102 when camera 104 detects motion. Camera 104 may be configured to work in low light, bright light, or other lighting conditions. In some embodiments, two or more cameras 104 may be provided.

Battery 105 may be any known in the art, including but not limited to rechargeable batteries 105. Similarly, remote dock station 106 may be configured to work with any user electronic device, including but not limited to a mobile phone or tablet. As well, USB port 107 may be configured to accept any standard USB and provide the data from an attached USB drive to mirror/touch screen 102 for processing.

Similarly, speakers 108 may be any known in the art, including but not limited to wired or wireless speakers 108. In some embodiments, mirror/touch screen 102 may be configured to provide audio to two or more speakers 108 such that, should a video chat participant on the other end of the line change position, the participant's audio may be played proportionately out of one or more speakers 108 such that the audio may mimic the way the audio would sound if the other participant were physically present with the present invention, and in some embodiments may do so in real time.

Light strip 109 may be configured such that it provides extra light to persons wishing to do their makeup using the present invention. Or, light strip 109 may be brightened up further to provide general purpose light to a room. Consequently, it is contemplated that light strip 109 may be configured to provide more or less light, and light of different quality such as brightness, color, or intensity, depending on a user's preferences.

Figure 2:
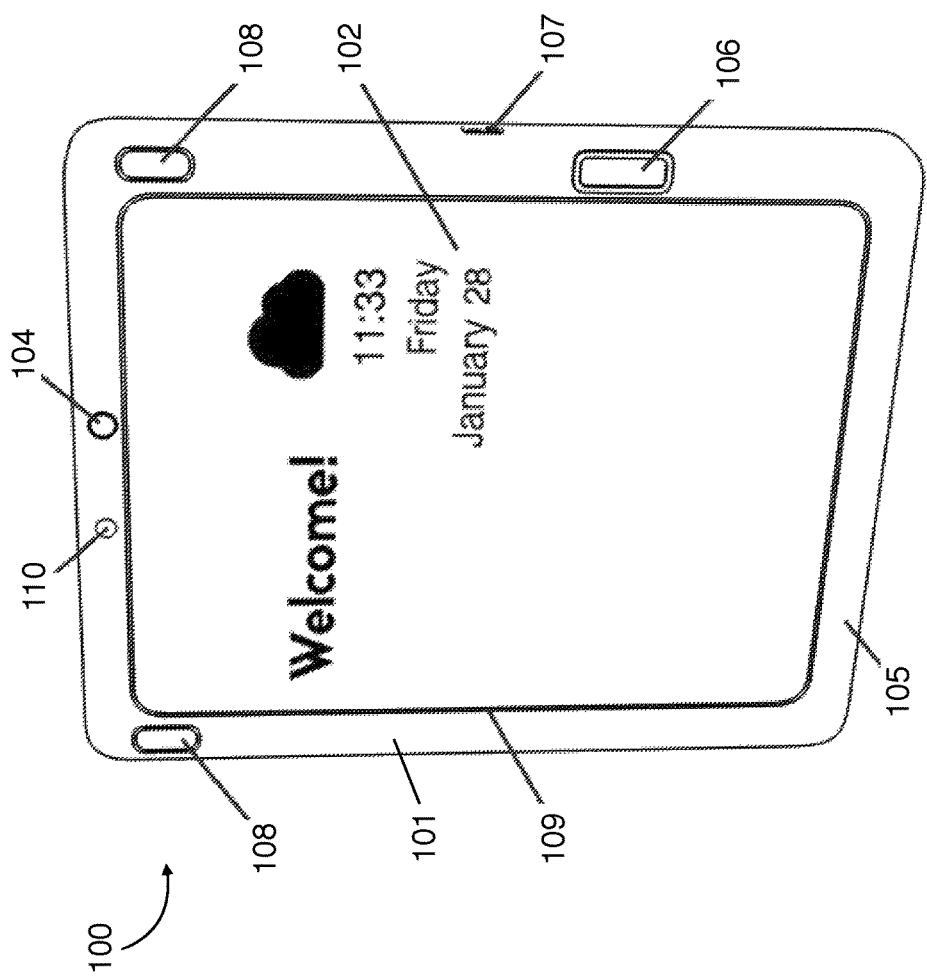
FIG. 2 shows a front perspective view of an embodiment of a smart mirror.

With respect to FIG. 2, a front perspective view of an embodiment of a smart mirror is shown. In the embodiment depicted, a viewer may perceive smart mirror 100, frame 101, mirror/touch screen 102, camera 104, battery 105, remote dock station 106, USB port 107, speakers 108, light strip 109, and wifi 110.

As may be generally discerned from FIG. 2, many different shapes and sizes of the present invention are contemplated. Although no reference object is shown in FIG. 2 to give the presented embodiment scale, embodiments of smart mirror 100 are contemplated to be as small as one-half inch in diameter to several feet long or wide. As may also be seen in FIG. 2, may different shapes of smart mirror 100 are contemplated, such as oval, square, rectangular, and so forth.

Figure 3:
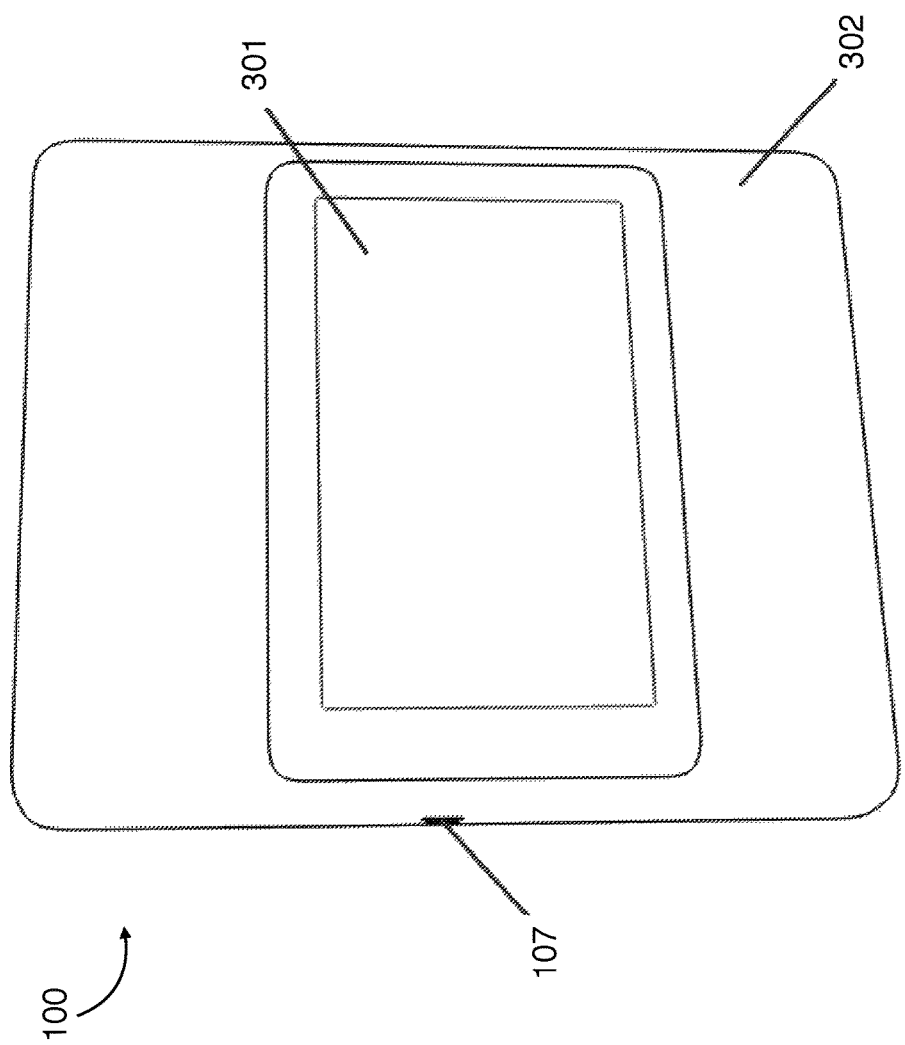
FIG. 3 shows a rear perspective view of a smart mirror in accordance with an embodiment of the invention.

With regards to FIG. 3, a rear perspective view of a smart mirror in accordance with an embodiment of the invention is shown. In the embodiment depicted, a viewer may perceive wall mount 301 and mirror base 302, as well as USB port 107.

FIG. 3 generally shows the rear side of a square or rectangular embodiment of smart mirror 100. As can be seen, one or more wall mounts 301 may be provided that enable the present invention to hang to a wall or other surface. Although the embodiment depicted in FIG. 3 appears to stick to wall using adhesive (not shown), in some embodiments wall mount 301 may comprise one or more chains suspended from one or more points disposed on the rear of smart mirror 100, one or more holes or notched disposed on the rear of smart mirror 100 that may be configured to receive a nail or other object, removable or permanent adhesive, and any other wall mount 301 element.

In some embodiments, mirror base 302 may be a prop-up stand that may enable smart mirror 100 to be portable and self-standing. In some embodiments, mirror base 302 may house one or more electrical components or processors of smart mirror 100.

Figure 4:
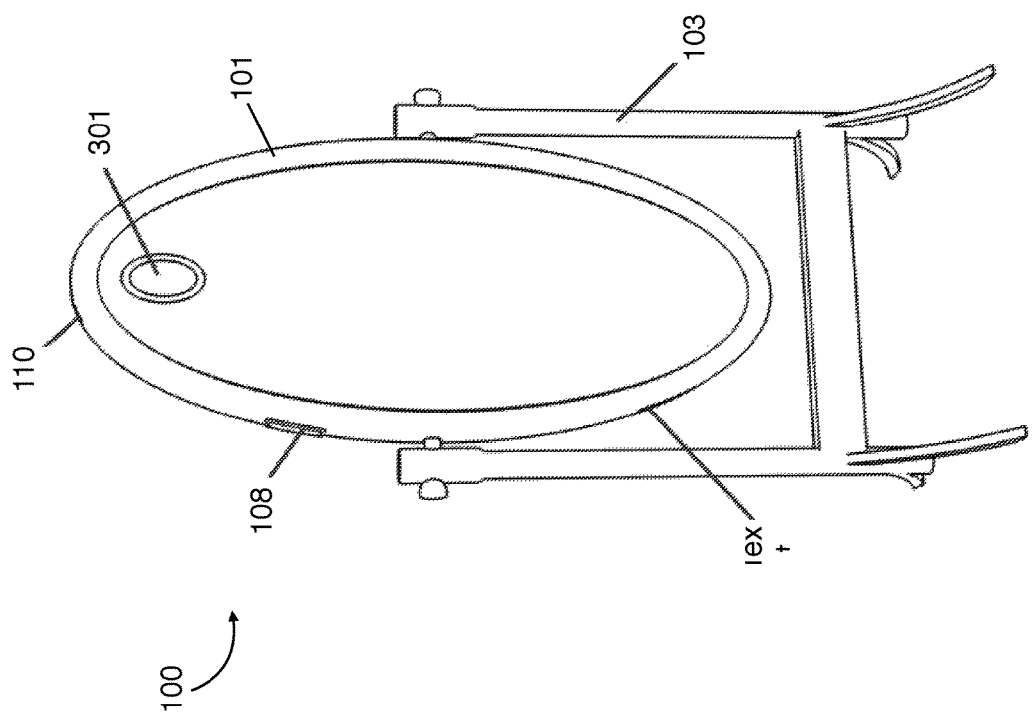
FIG. 4 shows a rear perspective view of a smart mirror in accordance with an embodiment of the invention.

Turning attention to FIG. 4, a rear perspective view of a smart mirror in accordance with an embodiment of the invention is shown. In the embodiment depicted, a viewer may perceive smart mirror 100, frame 101, stand 103, battery 105, speakers 108, wifi 110, and wall mount 301. In the embodiment shown in FIG. 4, a viewer may get a sense of the size and orientations of frame 101, stand 103, battery 105, speakers 108, wifi 110, and wall mount 301 relative to one another.

Figure 5:
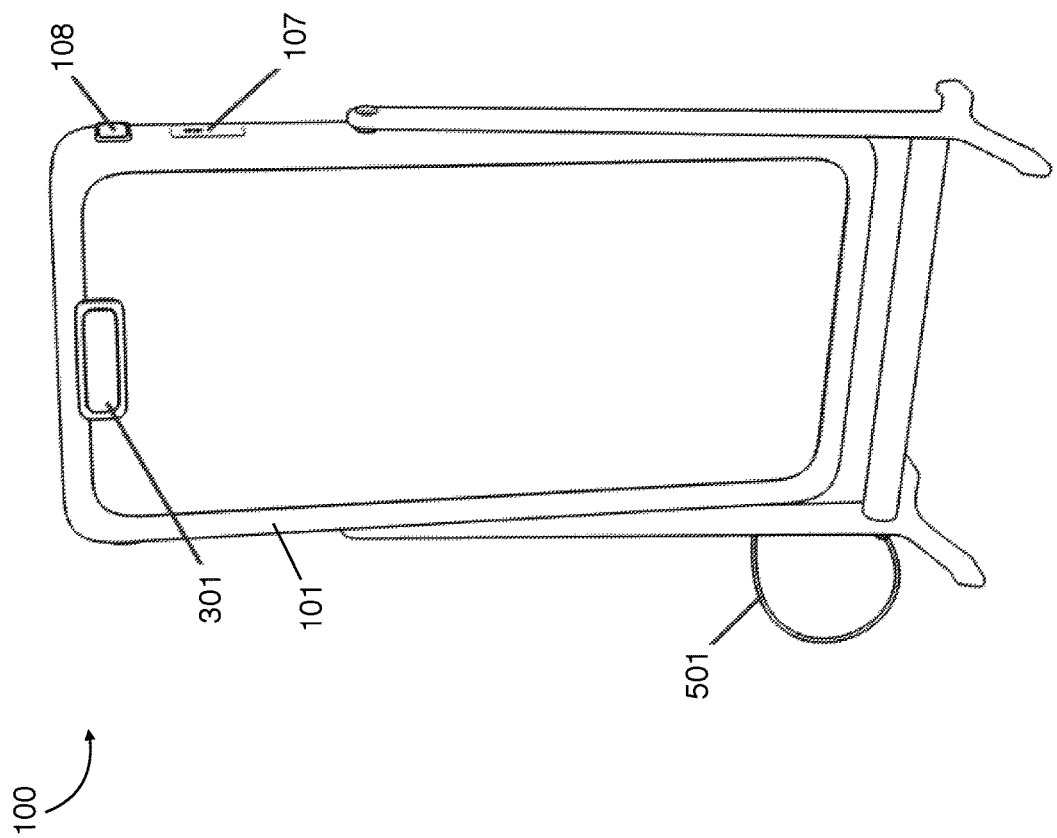
FIG. 5 shows a rear perspective view of a smart mirror in accordance with an embodiment of the invention.

With respect to FIG. 5, a rear perspective view of a smart mirror in accordance with an embodiment of the invention is disclosed. In the embodiment depicted, a viewer may perceive detachable charging chord/plug 501, as well as frame 101, USB port 107, speakers 108, and wall mount 301.

Detachable charging chord/plug 501 may provide users with the ability to attach and detach a power cord, thereby making the present invention more portable. In embodiments or configurations, wherein detachable charging chord/plug 501 has been disconnected, smart mirror 100 may run off of one or more batteries 105.

Figure 6:
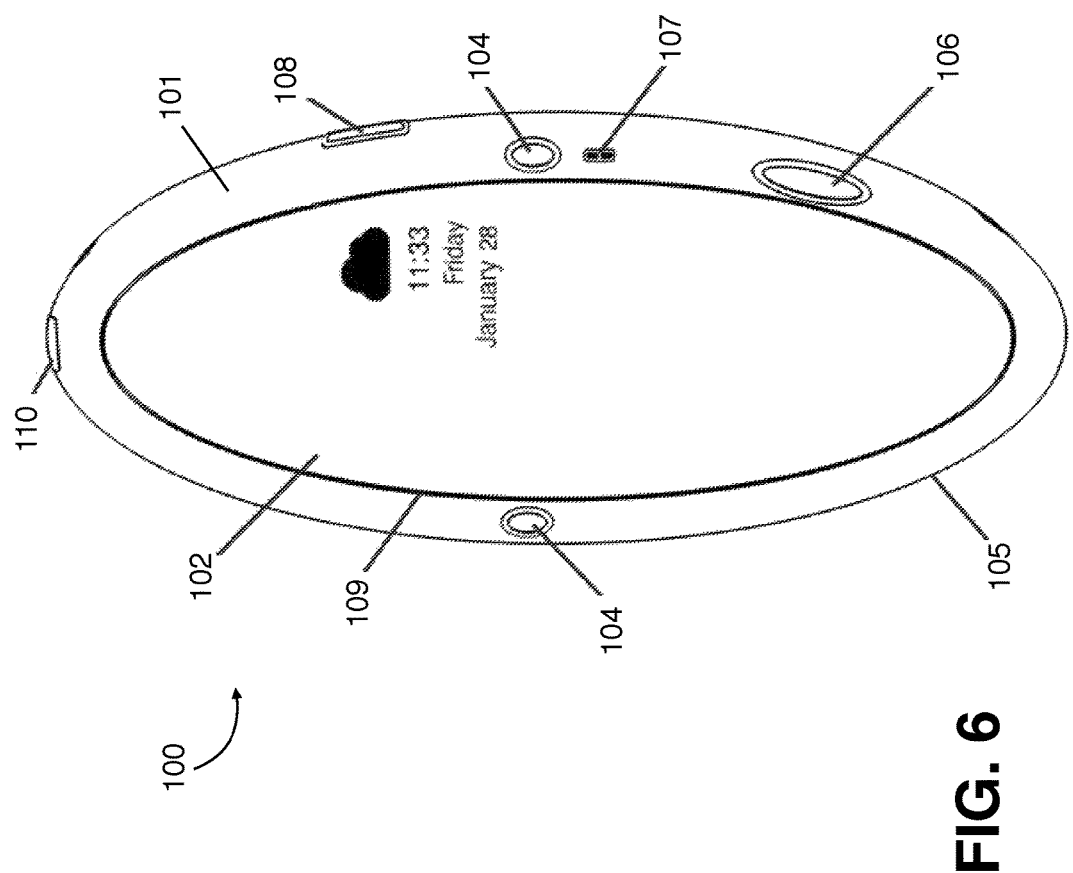
FIG. 6 shows a front perspective view of an embodiment of a smart mirror.

Turning attention to FIG. 6, a front perspective view of an embodiment of a smart mirror is shown. In the embodiment depicted, a viewer may perceive smart mirror 100, frame 101, mirror/touch screen 102, camera 104, battery 105, remote dock station 106, USB port 107, speakers 108, light strip 109, and wifi 110. FIG. 6 generally discloses a classic oval-shaped embodiment of the present invention.

Figure 7:
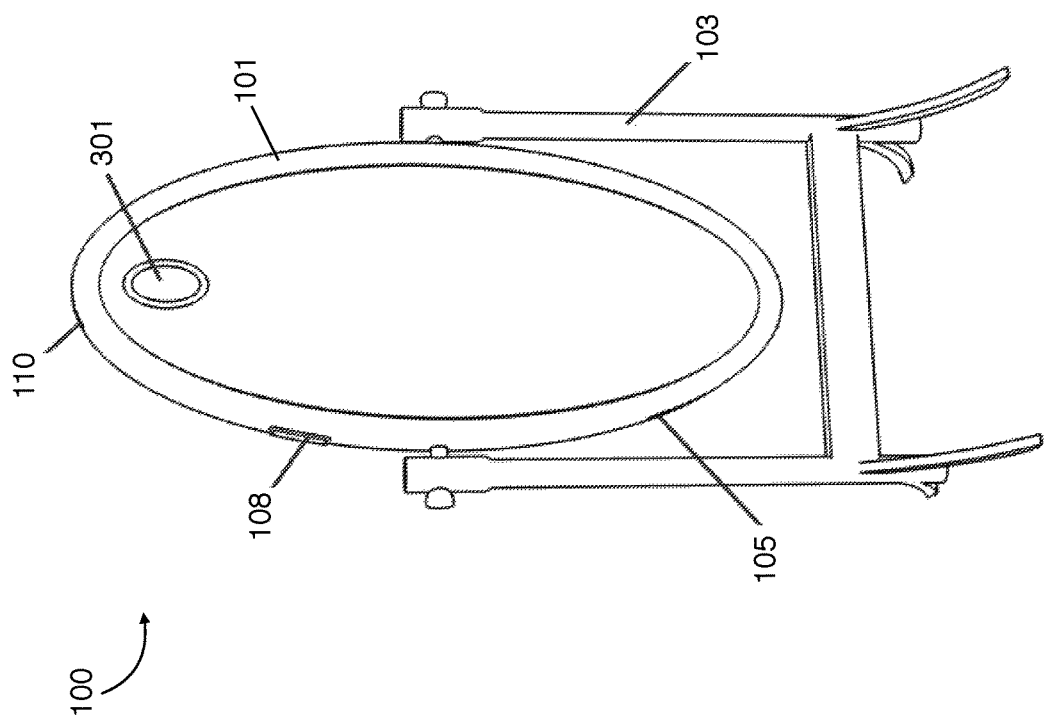
FIG. 7 shows a rear perspective view of an embodiment of a smart mirror.

With regard to FIG. 7, a rear perspective view of an embodiment of a smart mirror is disclosed. In the embodiment depicted, a viewer may perceive smart mirror 100, frame 101, stand 103, battery 105, speakers 108, wifi 110, and wall mount 301. FIG. 7 generally shows a reverse angle of an oval embodiment of smart mirror 100 as secured in stand 103.

Figure 8:
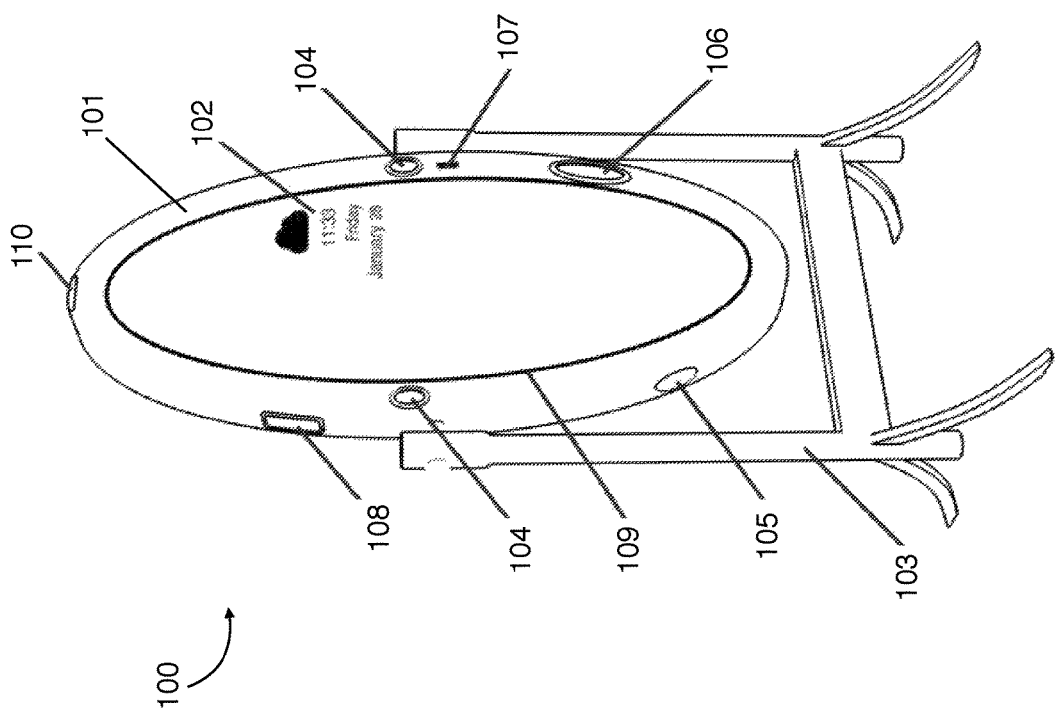
FIG. 8 shows a front perspective view of an embodiment of a smart mirror.

Turning attention to FIG. 8, a front perspective view of an embodiment of a smart mirror is disclosed. In the embodiment depicted, a viewer may perceive smart mirror 100, frame 101, mirror/touch screen 102, stand 103, camera 104, battery 105, remote dock station 106, USB port 107, speakers 108, light strip 109, and wifi 110. FIG. 8 may be thought of as the front side of one or more oval embodiments of smart mirror 100, including but not limited to an embodiment disclosed in FIG. 7.

Figure 9:
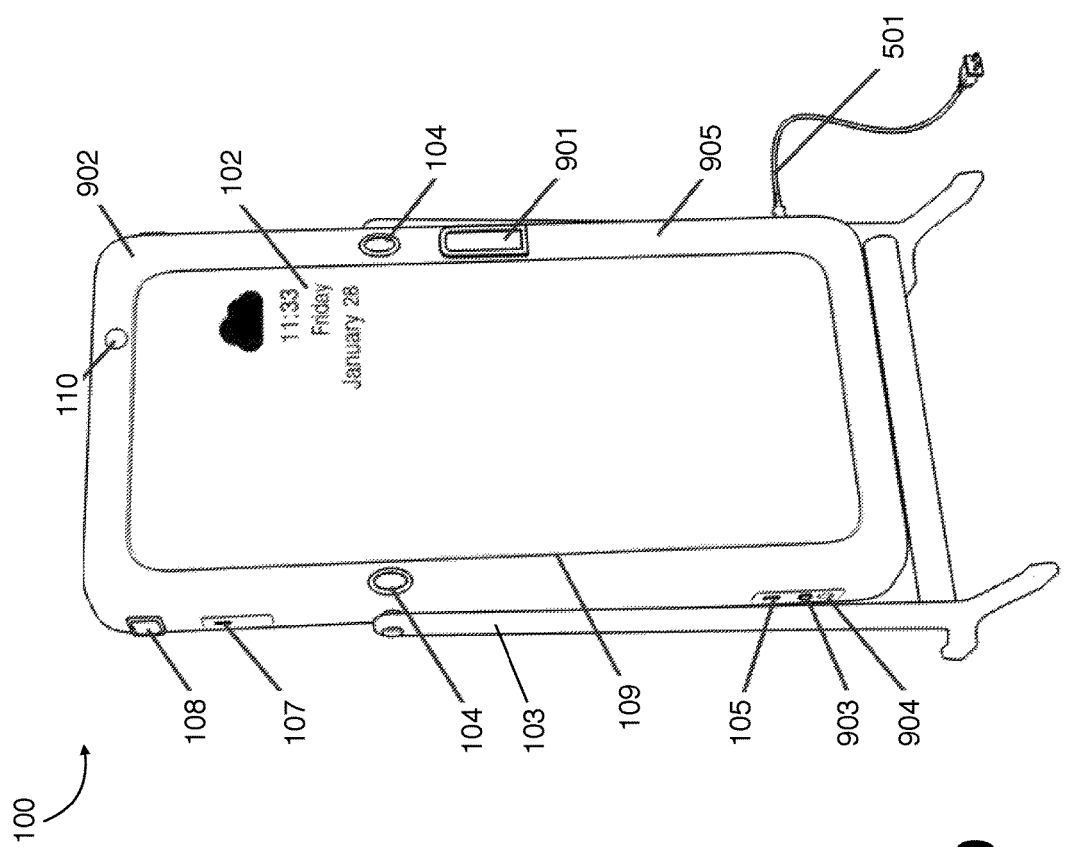
FIG. 9 illustrates a front perspective view of a smart mirror in accordance with an embodiment of the invention.

With respect to FIG. 9, a front perspective view of a smart mirror in accordance with an embodiment of the invention is disclosed. In the embodiment depicted, a viewer may perceive remote port 901, bluetooth 902, charging port 903, LED light 904, and digital frame 905, as well as mirror/touch screen 102, stand 103, camera 104, battery 105, remote dock station 106, USB port 107, speakers 108, light strip 109, wifi 110, and detachable charging chord/plug 501.

Remote port 901 may house or port one or more remote controls (not shown) that may operate one or more features of smart mirror 100. Moreover, in addition to wifi connectivity element 110, Bluetooth 902 may provide for short-range device-to-device data transfer between smart mirror 100 and another electronic device, including but not limited to a user's mobile phone. In some embodiments, a user may utilize Bluetooth 902 connectivity to manipulate one or more functions of smart mirror 100. In some embodiments, a user may utilize Bluetooth 902 connectivity to download one or more elements of data, for example data pertaining to a video chat such an image, audio recording, GPS location of a participant, chat time, and so forth of smart mirror 100 to a user's electronic device.

Charging port 903 may be of any known in the art to charge one or more mobile devices. In some embodiments, LED light 904 may indicate that smart mirror 100 is charging an electronic device. In some embodiments, smart mirror 100 may provide for two or more LED lights 904 for aesthetic reasons. In some embodiments, smart mirror 100 may provide for two or more LED lights 904 that may correspond to one or more functions or status conditions of the present invention, such as but not limited to if smart mirror 100 is on or off, if an audio call or video chat is still viable, if an incoming video chat is present, if a data upload or download is in progress, and so forth.

Digital frame 905 may, in some embodiments, be a space or border of mirror/touchscreen 102 left unmodified or white so as to add a matted visual effect to mirror/touchscreen 102. In some embodiments, digital frame 905 may comprise an actual physical border around mirror/touchscreen 102.

CONCLUSIONS, RAMIFICATIONS, AND SCOPE

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

While the present invention generally described herein has been disclosed in connection with a number of embodiments shown and described in detail, various modifications should be readily apparent to those of skill in the art.

What is claimed is:

1. A smart mirror, comprising:
   at least one frame having a front, a top, a bottom side, and a rear;
   at least one electronic device disposed on the front of the at least one frame, wherein the at least one has at least one display and at least one microphone;
   at least one camera disposed on the front of the at least one frame, wherein the at least one camera is communicatively coupled to the at least one electronic device;
   at least one speaker disposed on the front of the at least one frame, wherein the at least one speaker is communicatively coupled to the at least one electronic device;
   at least one battery disposed on the front of the at least one frame, wherein the at least one battery is communicatively coupled to the at least one electronic device;
   at least one docking element disposed on the front of the at least one frame, wherein the at least one docking element is communicatively coupled to the at least one electronic device, and wherein the at least one docking element is configured to removably communicatively couple with a second electronic device;
   at least one USB port disposed on the front of the at least one frame, wherein the at least one USB port is communicatively coupled to the at least one electronic device; and
   at least one wireless internet communication element disposed on the top of the at least one frame, wherein the at least one wireless internet communication element is communicatively coupled to the at least one electronic device; wherein the at least one speaker is at least two speakers, and wherein the at least one electronic device is configured to cause the at least two speakers to adjust their playback such that changes in the speaker's position are represented in the at least two speakers' playbacks in real time.

2. The smart mirror of claim 1, further comprising at least one light strip disposed on the front of the at least one frame.

3. The smart mirror of claim 1, further comprising at least one stand configured to support the at least one frame.

4. The smart mirror of claim 1, further comprising at least one wall hang element disposed on the rear of the at least one frame.

5. The smart mirror of claim 1, further comprising at least one wall mirror base disposed on the rear of the at least one frame.

6. The smart mirror of claim 1, further comprising at least one detachable power cord disposed on the side of the at least one frame.

7. The smart mirror of claim 1, wherein the at least one electronic device is at least two electronic devices disposed on the front of the at least one frame.

8. The smart mirror of claim 7, wherein the at least one frame is configured to fold over at least one electronic device.

9. The smart mirror of claim 1, wherein the at least one camera is configured to provide a mirror function when the at least one electronic device is not conducting a video chat.

* * * * *